United States Patent [19]

Keyser et al.

[11] Patent Number: 4,734,831
[45] Date of Patent: Mar. 29, 1988

[54] VISOR WITH CONCEALED REMOVABLE VANITY MIRROR

[75] Inventors: Michael T. Keyser, Holland; Russell L. Clark, Zeeland, both of Mich.

[73] Assignee: Prince Corporation, Holland, Mich.

[21] Appl. No.: 867,194

[22] Filed: May 28, 1986

[51] Int. Cl.[4] .............................................. B60Q 3/00
[52] U.S. Cl. ...................................... 362/74; 362/142; 362/80; 362/144; 296/97 H; 296/97 C
[58] Field of Search ................... 362/61, 80, 140, 141, 362/142, 74, 144; 296/97 G, 97 H, 97 R, 97 C

[56] References Cited

U.S. PATENT DOCUMENTS

| | | | |
|---|---|---|---|
| 1,775,486 | 9/1930 | Clements | 296/97 C |
| 2,107,247 | 2/1938 | Johnson | 296/97 C |
| 2,163,495 | 6/1939 | Levy | 160/33 |
| 2,685,336 | 8/1954 | Menighan | 160/32 |
| 2,755,126 | 7/1956 | Ludlow | 296/97 C |
| 2,894,576 | 7/1959 | Williams | 160/220 |
| 3,158,396 | 11/1964 | Berger | 296/97 C |
| 3,336,073 | 8/1967 | Berger | 296/97 C |
| 3,714,411 | 1/1973 | Waters et al. | 362/183 |
| 3,877,745 | 4/1975 | Girard | 296/97 C |
| 4,003,597 | 1/1977 | Acuff | 296/97 C |
| 4,213,169 | 7/1980 | Kempkers | 362/80 |
| 4,227,241 | 10/1980 | Marcus | 362/61 |
| 4,486,819 | 12/1984 | Marcus et al. | 362/80 |
| 4,511,954 | 4/1985 | Marcus et al. | 362/144 |
| 4,541,663 | 9/1985 | Schwanitz et al. | 362/144 |
| 4,591,956 | 5/1986 | Majchrzak | 362/144 |
| 4,624,499 | 11/1986 | Flowerday | 362/144 |

FOREIGN PATENT DOCUMENTS 3222194 12/1983 Fed. Rep. of Germany .

Primary Examiner—William A. Cuchlinski, Jr.
Assistant Examiner—D. M. Cox
Attorney, Agent, or Firm—Price, Heneveld, Cooper, DeWitt & Litton

[57] ABSTRACT

A visor for a vehicle includes a vanity mirror assembly which is movable from a stored position within a compartment formed in the visor body to a first use position attached to but extended from the visor body. The vanity mirror assembly can also be detached from the visor for remote use. In the preferred embodiment, the mirror is illuminated by one or more lamps powered by a self-contained rechargeable power source in the vanity mirror assembly.

36 Claims, 11 Drawing Figures

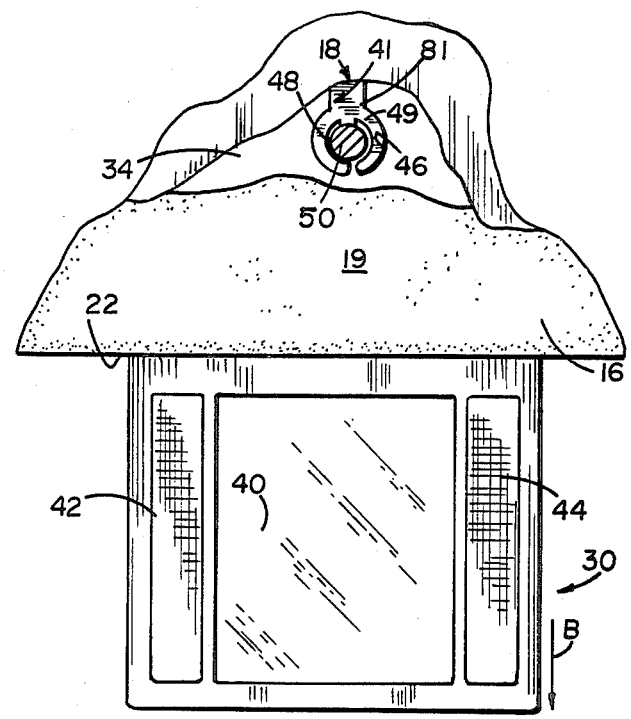
FIG. 3
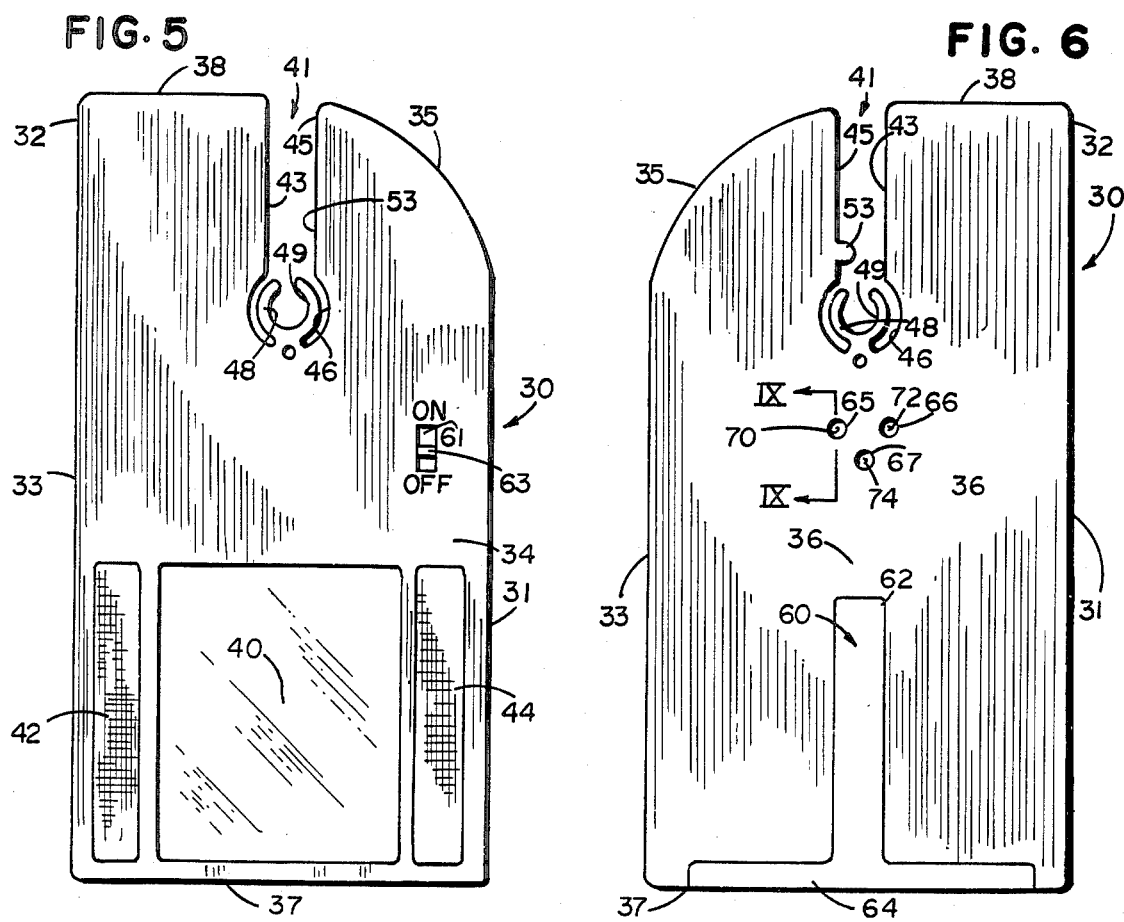
FIG. 5
FIG. 6

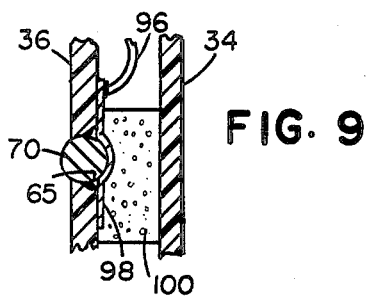
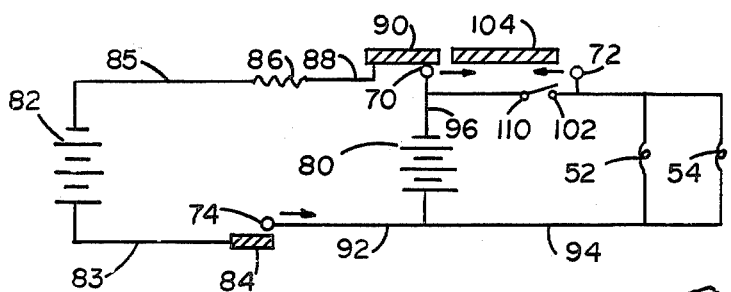
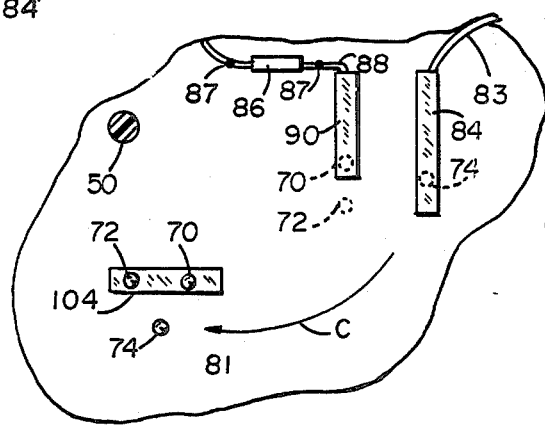
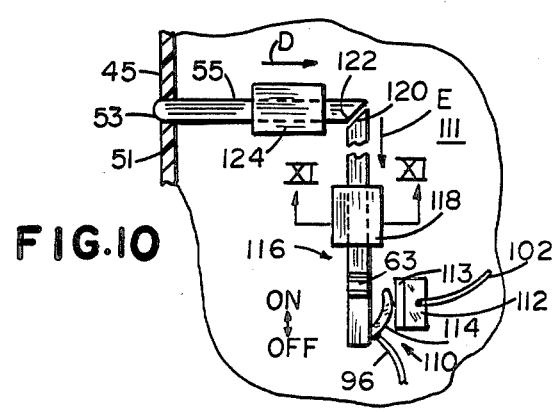
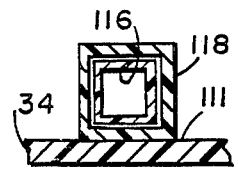

VISOR WITH CONCEALED REMOVABLE VANITY MIRROR

BACKGROUND OF THE INVENTION

The present invention pertains to automotive visors with vanity mirrors.

Visors with illuminated vanity mirrors covered for protection during non-use have gained tremendous popularity for use in vehicles. U.S. Pat. Nos. 4,227,241 and 4,486,819 disclose two different types of vanity mirror visors which are currently in commercial use in automobiles. Recently, a new visor design has been proposed in which an illuminated vanity mirror pivots from the body of a visor which construction is shown in U.S. Pat. No. 4,624,499 entitled VISOR WITH PIVOTED CONCEALED VANITY MIRROR. In each of these visor constructions, the lamp means associated with the illuminated mirror are powered directly by the vehicle's electrical supply, and the vanity mirror is permanently attached to the vehicle visor.

SUMMARY OF THE PRESENT INVENTION

The illuminated vanity mirror and visor of the preferred embodiment of the present invention provides a vanity mirror which pivots downwardly and outwardly from a visor body on an axis orthogonal to the visor body and includes a rechargeable battery therein and means for removably pivoting the vanity mirror from the visor. Such construction allows the vanity mirror to be pivoted downwardly and used while still coupled to the visor or removed completely from the visor for use as a hand-held illuminated vanity mirror. The electrical circuit associated with the removable vanity mirror provides charging means for trickle charging the rechargeable battery from the vehicle's electrical system when the unit is positioned in the visor.

Visors embodying the present invention include a visor body having a recess with an access opening along an edge of the visor. A generally rectangular vanity mirror panel assembly is coupled to the visor body by removable connection between the visor and the vanity mirror panel assembly to move between a stored position within the recess of the visor to a first use position coupled to the visor and extending therefrom or a second use position removed from the visor. In a preferred embodiment, the vanity mirror panel assembly is illuminated and includes a battery for providing electrical power to the illumination means for the vanity mirror when in either use position. In a preferred embodiment of the invention, an electric circuit means are provided for trickle charging the battery when the vanity mirror assembly is in a stored position. The resultant structure provides a vanity mirror visor which can be used in connection with the visor in the vehicle or can be removed from the visor for use anywhere in the vehicle or elsewhere.

These and other features, advantages and objects of the present invention will become apparent upon reading the following description thereof together with reference to the accompanying drawings in which:

BRIEF DESCRIPTION OF THE DRAWINGS

FIG. 3 is a fragmentary front elevational view of the visor partly broken away and in cross section showing the illuminated vanity mirror in a lowered first use position;

FIG. 5 is a front elevational view of the illuminated vanity mirror assembly in a second use position removed from the visor body;

FIG. 6 is a rear elevational view of the structure shown in FIG. 5;

FIG. 7 is an electrical circuit diagram in schematic form of the electrical circuit components of the present invention;

FIG. 8 is a fragmentary broken away front elevational view of the inside rear surface of the visor body showing the relationship of the electrical contacts on the vanity mirror assembly and the visor body;

FIG. 9 is an enlarged fragmentary cross-sectional view taken along section lines IX—IX of FIG. 6;

FIG. 10 is a broken away fragmentary front elevational view of the switch control mechanism associated with the vanity mirror assembly as partly shown also in FIGS. 5 and 6; and FIG. 11 is a fragmentary enlarged cross-sectional view taken along section lines XI—XI of FIG. 10.

DETAILED DESCRIPTION OF THE PREFERRED EMBODIMENT

Figure 1:
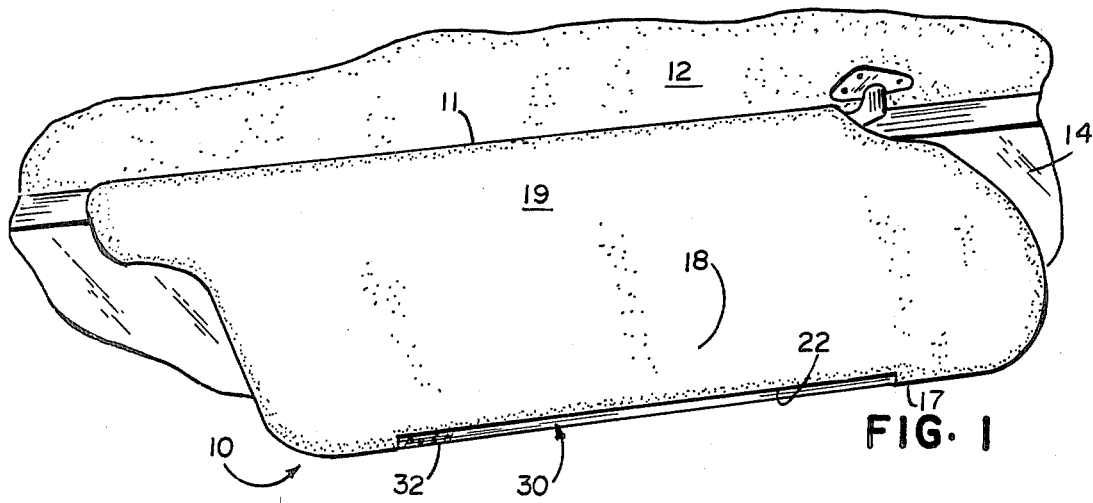
FIG. 1 is a perspective view of a visor embodying the present invention installed in a vehicle with the visor shown in a lowered position.

Referring initially to FIG. 1 there is shown a visor 10 embodying the present invention and which is mounted to the roof 12 of the vehicle by a pivot mounting bracket 20. Visor 10 is shown in its lowered use and sun blocking position extending downwardly over the top edge of the vehicle windshield 14. The top edge 11 of the visor is pivoted on an internal pivot rod mechanism which can be of the type disclosed in U.S. Pat. No. 4,500,131. The extending end of the pivot rod is coupled to the elbow bracket assembly 20 for conventional movement of the visor.

Figure 4:
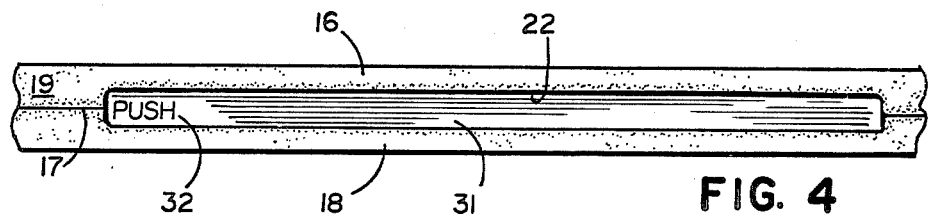
FIG. 4 is a fragmentary bottom plan view of the lower edge of the visor shown in FIG. 1.

As best seen in FIG. 4, the visor 10 includes a visor body made of two core halves 16 and 18 which are joined along a common seam 17 and covered with a suitable upholstery material 19 as taught by U.S. Pat. No. 4,570,990. The visor core halves 16 and 18 are formed to include a bottom opening recess or compartment 22, for receiving therein a pivoted and removable illuminated vanity mirror assembly 30 which can be pivoted from the stored position, as shown in FIG. 1, by pushing upwardly on the corner 32 thereof of its edge 31 (FIGS. 4–6) thereby pivoting assembly 30 downwardly in a direction, indicated by arrow A in FIG. 2, to a lowered first use position, as illustrated in FIG. 3, while still attached out removable from the visor body.

In the lowered first use position, the illuminated vanity mirror assembly 30 exposes a generally square mirror 40 bordered on either side by a pair of lenses 42 and 44 behind which there is mounted a pair of lamps 52 and 54 (FIG. 7) for selectively providing illumination for the mirror 40 as described in greater detail below. The mirror and lenses are secured to and behind the lower portion of fron wall 34 of illuminated vanity mirror assembly 30 which defines a mirror frame and which partially encloses the remaining elements of the illuminated vanity mirror assembly.

Assembly 30 includes a generally rectangular housing defined by wall 34, a rear wall 36 (FIG. 6), edge 31 and opposite edge 33 which is curved near its upper corner 35 to provide clearance for the pivoted assembly 30. The housing also includes a lower edge 37 and a top edge 38.

A generally elongated rectangular notch 41 (FIGS. 3, 5 and 6) extends through the housing and is spanned on either side by enclosure walls 43 and 45 and terminates in a circular opening 46 centered in which there is a resilient polymeric socket 48 of generally cylindrical construction split along a vertical plane, as seen in FIGS. 5 and 6. Socket 48 is integrally molded in halves to each of the sides 34 and 36 and subsequently joined by a suitable bonding adhesive. The two arcuate resilient legs defining socket 48 have tapered facing free edges with a slot 49 therebetween sufficiently wide to receive a pivot post 50 (FIGS. 3 and 8) which extends between walls 18 and 16 of the visor body.

Figure 2:
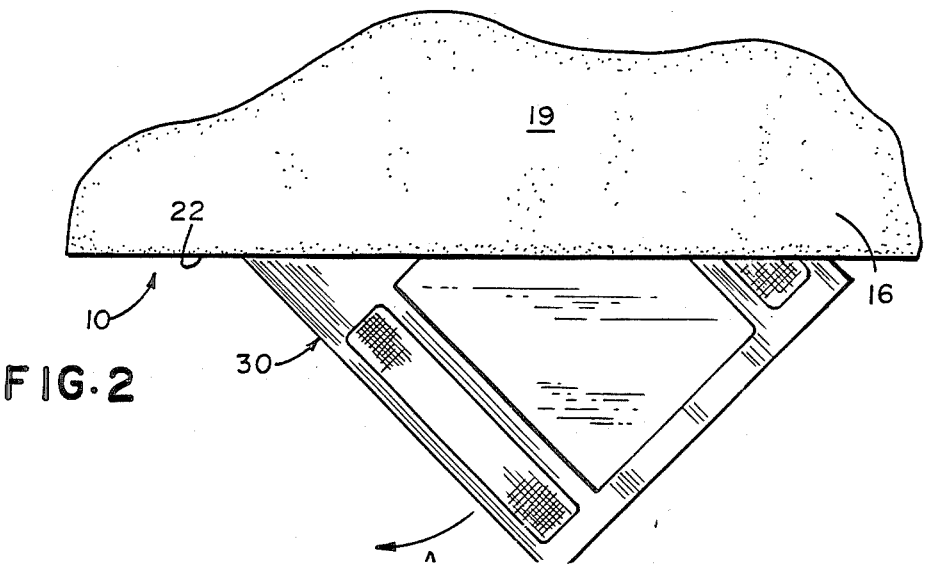
FIG. 2 is a fragmentary front elevational view of the visor with the illuminated vanity mirror partially pivoted from the visor body.

Thus, socket 48 partially circumscribes the post which extends in a plane vertical to the plane of the drawing FIGS. 1-3 for removably and pivotally receiving the vanity mirror assembly 30. The socket 48 grips post 50 sufficiently tightly such that, together with the friction of walls 34 and 36 of assembly 30 to the inner surfaces of walls 16 and 18 of the visor body, the assembly will remain in the stored position until forced outwardly.

The width of notch of 41 is such that the pivot pin or post 50 can easily slide therethrough for removal of the vanity mirror assembly as shown in FIGS. 5 and 6, by pulling the vanity mirror assembly outwardly in a direction indicated by arrow B in FIG. 3. As this is accomplished, the arcuate arms defining socket 48 resiliently bend outwardly permitting pivot post 50 to be released thereby and the vanity mirror assembly removed. Similarly, the vanity mirror assembly can be reinstalled by aligning the assembly to the left side of the visor as illustrated in FIG. 3, with post 50 centered in notch 41 and pushing in a direction opposite arrow B until the assembly assumes a position shown in FIG. 3.

Side wall 45 includes an aperture 51 (FIG. 10) therethrough for receiving a push rod 55 having a curved end 53 which extends as best seen in FIGS. 5 and 6, within the pathway of post 50 in notch 41 for actuating a switch 110 (FIGS. 7 and 10) to assure that the lamps 52 and 54 of the illuminated vanity mirror are turned off when the illuminated vanity mirror package is either installed or removed from the visor as described in greater detail below.

The rear wall 36 of assembly 30 also includes a pivoted inverted T-shaped stand 60 which is pivoted by a pivot pin at its upper end 62 to wall 36 and includes an elongated rectangular leg 64 at its lower end. Stand 60 can be pivoted outwardly from the housing defined partially by walls 34 and 36 for allowing the illuminated vanity mirror assembly to stand on its edge 37 supported by edge 37 and the spaced lower leg 64 of the pivoted inverted T-shaped stand 60 in the event it is to be used on a support surface once removed from the visor. The front wall 34 of assembly 30 includes a rectangular aperture 61 through which there extends the actuating button 63 (FIGS. 5 and 10) of the manually operated switch 110 for controlling the lamps 52 and 54 when the illuminated vanity mirror assembly is removed from the visor as described below.

The rear surface 36 of the assembly 30, as best seen in FIG. 6, includes three circular apertures 65, 66 and 67 arranged at the apices of an equilateral triangle and behind which there is positioned three biased ball-type electrical contacts 70, 72 and 74 which are employed to selectively activate the lamps of the illuminated vanity mirror when the assembly is positioned to a lowered use position as shown in FIG. 3, or apply a trickle charge from the vehicle's electrical supply system to the illuminated vanity mirror assembly's internal rechargeable battery 80 (FIG. 7) when the illuminated vanity mirror is raised to the stored position as shown in FIG. 1. The housing defining the illuminated vanity mirror assembly 30 is molded of a suitable polymeric material such as polycarbonate to withstand the temperatures incurred. The material provides sufficient resiliency for the socket 48 to allow the unit to be securely but removably held within the visor body as described. Having described the basic structural elements of the illuminated vanity mirror assembly, a description of the electrical circuit components positioned within the housing and visor body and the operation of the various electrical circuit components is described in connection with FIGS. 7-11.

In FIG. 7, the electrical circuit components are shown in a position as they appear when the illuminated vanity mirror assembly 30 is stored as illustrated in FIG. 1. The vehicle's electrical supply system is represented by battery 82 which is coupled to a grounding conductive strip 84 secured to the inside surface 81 of visor panel 18 by a suitable bonding adhesive and coupled to the ground terminal of battery 82 typically coupled to the vehicle's chassis by an electrical conductor 83. Strip 84 is thus a fixed conductive strip and, in the preferred embodiment, has a width of approximately one-half inch and is made out of brass. The end of conductor 83 is soldered to strip 84 in a conventional manner. The positive side of the vehicle's electrical supply 82 is coupled via a conductor 85 to a current limiting resistor 86 having a value of approximately 2 kilo-ohms and which is also mounted to surface 81 of panel 18 by suitable spaced terminal posts 87 (FIG. 8). A conductor 88 couples the end of resistor 86 remote from conductor 85 to a positive supply conductive strip 90 spaced in parallel relationship to strip 84 and secured to surface 81. Strip 90, like strip 84, is made of a relatively thin conductive material and is fixed in position on the surface of panel 18 as shown in FIG. 8. Conductor 88 is suitably soldered to an edge of strip 90.

A rechargeable nickel cadmium battery 80 is suitably mounted within the housing between walls 34 and 36 in the area of the junction of edges 38 and 32 and held in position by a suitable conventional battery holder. For purposes of removing the battery if necessary, panel 38 can be made to be removable for access to the battery holder for replacement. The battery is preferably one or more nickel cadmium rechargeable cells which will last for several years. Although the vehicle's system is approximately 12 volts, battery 80 may be a lesser voltage level such as 9.6 volts, typically available with multiple cell nickel cadmium batteries in a conventional battery holder of sufficient thinness to fit between the walls 34 and 36.

The negative side of battery 80 is coupled to ball 74 by a conductor 92 and to a common terminal of lamps 52 and 54 by conductor 94 which extends to one terminal of each of the lamps 52 and 54. It is noted here that the connection of conductor 92 to ball 74 is substantially the same as the connection shown in FIG. 9 for the ball 70 described below. The positive side of battery 80 is coupled to ball 70 by conductor 96 which extends as seen in FIG. 9, to a thin flexible foil-like sheet of brass 98 which overlies the rear edge of tapered aperture 65 into which ball 70 is seated. The outer diameter of aperture 65 is smaller in diameter than the conductive metal ball 70 such that the ball cannot pass therethrough but it projects outwardly from the outer surface of panel 36 distance sufficient to engage its associated contact strips 90 and 104 (FIG. 8). Behind conductive foil 98 there is positioned a compressed foam backing material 100 which secures the foil against ball 70 and provides a spring-loaded effect for the ball seating it in position and allowing ball to depress inwardly slightly as it rides over its associated contacts as described below in connection with FIG. 8. Each of the remaining balls 72 and 74 are similarly coupled to their associated conductors.

Conductor 96 also extends to one contact 114 of manually operated switch 110 (FIGS. 7 and 10) having a remaining contact 11 coupled by conductor 102 to ball 72 and to the remaining or positive terminal of lamps 52 and 54. A shorting electrically conductive strip 104 is secured on the surface 81 of panel 18 as seen in FIG. 8, in an arcuate position approximately rotated 90° in a clockwise direction from strips 84 and 90 for selectively electrically shorting balls 70 and 72 together thereby bypassing switch 110 when the illuminated vanity mirror visor is in a lowered use position. The electrical operation of the illuminated vanity mirror between the position shown in FIG. 1 as illustrated in FIG. 7, and the lowered use position as shown in FIG. 3 and in solid lines in FIG. 8 is now described.

Referring initially to FIG. 7, when the illuminated vanity mirror is within the visor body, as shown in FIG. 1, ball 74 which is the grounding ball is in a raised position shown in phantom lines in FIG. 8 and contacting ground strip 84 and is therefore coupled to the ground terminal of the vehicle's battery 82 through the vehicle's normal wiring harnass including conductor 83. Similarly, the trickle charging contact ball 70 engages strip 90 as illustrated in FIG. 7, to make electrical contact such that current can flow from battery 82 through resistor 86 and the contacts including strip 90 and ball 70 to the positive terminal of rechargeable nickel cadmium battery 80. The length of strip 90 is shorter than that of strip 84 such that in the stored position, ball contact 72 does not engage strip 90 as illustrated in phantom lines in FIG. 8 and as shown in the electrical circuit diagram of FIG. 7. Thus, and as described below, with switch 110 in an open position, illustrated in FIG. 7, there is no electrical current path from either battery 82 or battery 80 to the lamps 52 and 54 and they are extinguished. When, however, the illuminated vanity mirror 30 is pivoted downwardly by pushing on edge 32 in a direction indicated by arrow C in FIG. 8, both ball contacts 70 and 72 move to simultaneously engage contact strip 104 thereby electrically shorting these two contact which couples the positive side of the rechargeable battery 80 to conductor 102 and therefore activates lamps 52 and 54. At this time, the grounding contact 74 is removed from grounding contact 84 and is only contacting the polymeric surface 81 of panel 18 thereby disconnecting the vehicle's battery from the circuit as seen in FIG. 8 in solid lines for the ball.

Thus, the illumination means for the mirror 40 is automatically turned on when the illuminated vanity mirror assembly 30 is pivoted from the stored position in FIG. 1 to the use position in FIG. 3 relying on the internal battery 80 for providing electrical power for the lamps. When the assembly is retracted to its stored position shown in FIG. 1, power is turned off to the lamps and trickle charge is provided to the rechargeable battery 80 through the vehicle's battery 82 and current limiting resistor 86. When removed from the visor, the illumination means will initially be extinguished automatically by the mechanism shown in FIGS. 4, 5, 10 and 11, but can be manually actuated by switch 110 as now described in connection with these Figures.

SWitch 110 includes a stationary contact 112 mounted on the inner surface 111 of wall 34 of the assembly. Conductor 102 is soldered to the fixed contact 112 which can take the shape of an upturned L-shaped member secured to the insulative wall 34 and having an upstanding or vertically extending contact edge 113 which is selectively engaged by a movable contact arm 114. Contact 114 constitutes an arcuately curved arm made of a conductive material such as beryllium copper to provide a contact force against conductive surface 113 of contact 112 and is secured to the switch slide body 116 (FIG. 10) by suitable fastening means such as a rivet or by heat staking to an integrally molded post on the insulative member 116. Conductor 96 is secured to contact 114 by soldering with the switch being shown in its on or upward position in FIG. 10.

Switch slide member 116 is generally rectangular as best seen in FIG. 11, and includes the projecting button 63 which extends outwardly through aperture 61 as shown in FIG. 5, for manual sliding of the switch between the on and off positions. In the off position, contact 114 slides downwardly in FIG. 10 until it disengages contact 113 to open switch 110 and prevent power from battery 80 reaching lamps 82 and 84. Slide 116 extends through a rectangular guide member 118 secured to surface 111 of wall 34 as best seen in FIG. 11, to attach the slide in a sliding fashion to wall 34. The upper edge 120 is beveled at a 45° angle and includes a solid end wall for actuation by the similarly beveled end 122 of similarly shaped push rod 55 also supported by a sliding support collar 124. The end 53 of push rod 55 projects through aperture 51 into notch 41 as best seen in FIGS. 5 and 6 such that post 50 (FIG. 8) will move push rod 55 in a direction indicated by arrow D in FIG. 10 which, in turn, actuates slide 116 in a direction indicated by arrow E in FIG. 10, to move contact 114 downwardly to the off position. Thus, whenever the illuminated vanity mirror is removed from the visor, push rod 55 will be actuated to turn off the switch to make certain that it initially is in its off position. The switch can then be manually actuated by the user by projection 63 to the desired on position for use. Upon reinsertion of the illuminated vanity mirror into the visor, regardless of the position of slide 116, plunger 55 will be actuated to assure that switch 110 is moved to the off position so that in the event the user has left the switch on, it will not be stored in the visor with the lamps illuminated thereby discharging batter 80 faster than it can be trickle charged through resistor 86. A tension spring may be provided and coupled between wall 45 and plunger 55 to assure the plunger remains in a position shown in FIG. 10.

The system of the present invention therefore provides a vanity mirror which can be used attached to or detached from the vehicle visor. When not in use, it is stored unobtrusively in the visor body. In its preferred embodiment, the vanity mirror is illuminated and preferably through a self-contained power source which is recharged automatically when the mirror is stored.

It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A vehicle visor comprising:
    a visor body defining a recess with an opening at one edge of said visor body for access to said recess;
    a mirror panel assembly including a mirror on one side, said panel assembly shaped to fit within said recess; and
    means for pivotally coupling said panel assembly to said visor body for pivotal movement in a plane paralel to the plane of said visor body and between a stored position within said recess, a first use position pivotally rotated from said visor body and a second use position removed from said visor body, said means including a resilient member which deflects to allow said panel assembly to be grasped and removed from said visor body when in said second position for use of said mirror remote from said visor.

2. The visor as defined in claim 1 wherein said means for pivotally and removably coupling said panel assembly to said visor comprises pivot pin means on one of said visor body or panel assembly and socket means for releasably holding said pivot pin means on the other of said visor body or panel assembly.

3. A vehicle visor comprising:
    a visor body defining a recess with an opening at one edge of said visor body for access to said recess;
    a mirror panel assembly including a mirror on one side, said panel assembly shaped to fit within said recess; and
    means for removably and pivotally coupling said panel assembly to said visor body for pivotal movement in a plane parallel to the plane of said visor body and between a stored position within said recess, a first use position pivotaly rotated from said visor body and a second use position removed from said visor body, wherein said means for pivotally and removably coupling said panel assembly to said visor comprises pivot pin means on one of said visor body or panel assembly and socket means for releasably holding said pivot pin means on the other of said visor body or panel assembly; and wherein said socket means includes resilient arm means for deflecting to allow said pivot pin means to snap in and out of said socket means.

4. The visor as defined in claim 3 wherein said resilient arm means comprises a pair of arcuate arms extending from a base and terminating at an end remote from said base to define a slot between said remote ends of said arms having a width less than that of said pivot pin means.

5. The visor as defined in claim 4 wherein said pivot pin means comprises at least one cylindrical-shaped pin.

6. The visor as defined in claim 5 wherein said pivot pin is mounted to said visor body to extend across opposite sides of said recess and said resilient arm means are mounted to said panel assembly.

7. The visor as defined in claim 6 wherein said panel assembly includes a generally rectangular housing having a notch extending partially through said housing from one edge toward said mirror and wherein said arcuate arms extend from said housing at the end of said notch and face said one edge, said notch having a width greater than the diameter of said pivot pin such that said housing can be extended over said pivot pin.

8. The visor as defined in claim 7 and further including means for illuminating said mirror.

9. The visor as defined in claim 8 wherein said illuminating means is mounted within said housing and selectively provides illumination for said mirror in both said first and said second use positions.

10. The visor as defined in claim 9 wherein said illuminating means includes lamp means mounted in said housing adjacent said mirror for directing illumination outwardly from said housing, battery means positioned within said housing; and
    an electrical circuit selectively coupling said battery means to said lamp means for actuating said lamp means.

11. The visor as defined in claim 10 wherein said electrical circuit includes an operator-actuated switch means mounted to said housing.

12. The visor as defined in claim 11 wherein said electrical circuit includes second switch means actuated by the movement of said panel assembly from said stored position to said first position for coupling said battery to said lamp means when said panel assembly is in said first position.

13. The visor as defined in claim 12 wherein said battery is a rechargeable battery.

14. The visor as defined in claim 13 wherein said electrical circuit further includes electrical contact means mounted on each of said panel assembly and within said recess of said visor body wherein said contact means on said panel assembly is coupled to said rechargeable battery and wherein said contact means in said visor recess is coupled to an electrical conductor for coupling to the vehicle's electrical supply system and wherein said contacts are positioned to engage each other for trickle charging said rechargeable battery when said panel assembly is in the stored position.

15. The visor as defined in claim 14 wherein said second switch means comprises a pair of spaced contacts positioned on said housing with one of said spaced contacts coupled to said rechargeable battery and the other to said lamp means, and a shorting contact positioned in said recess of said visor body to electrically couple said spaced contacts together when said panel assembly is pivoted to said first use position for actuating said lamp means.

16. A vehicle visor comprising:
    a visor body for mounting to a vehicle for movement between a raised stored position and a lowered sun blocking use position, said body including a recess therein for receiving a removable vanity mirror assembly and wherein said recess includes an access opening along an edge of said visor body;
    a vanity mirror panel assembly including a generally flat housing with a mirror mounted on one side thereof, a notch formed in said housing from one edge thereof and socket means formed at an end of said notch remote from said one edge of said housing;
    post means extending across said recess in said visor body and positioned to align with said notch of said housing and having a dimension such that said post will slide within said notch and be releasably held by said socket means such that said panel assembly can be pivoted around said post to a first use position and slidably removed from said visor body to a second use position independent of said visor body; and means for illuminating said mirror, wherein said illuminating means is mounted within said housing and selectively provides illumination for said mirror in both said first and said second use positions.

17. The visor as defined in claim 16 wherein said illuminating means includes lamp means mounted in said housing adjacent said mirror for directing illumination outwardly from said housing, battery means positioned within said housing; and an electrical circuit selectively coupling said battery means to said lamp means for actuating said lamp means.

18. The visor as defined in claim 17 wherein said electrical circuit included an operator-actuated switch means mounted to said housing.

19. The visor as defined in claim 18 wherein said electrical circuit includes second switch means actuated by the movement of said panel assembly from said stored position to said first position for coupling said battery to said lamp means when said panel assembly is in said first position.

20. The visor as defined in claim 19 wherein said battery is a rechargeable battery.

21. The visor as defined in claim 20 wherein said electrical circuit further includes electrical contact means mounted on each of said panel assembly and within said recess of said visor body wherein said contact means on said panel assembly is coupled to said rechargeable battery and wherein said contact means in said visor recess is coupled to an electrical conductor for coupling to the vehicle's electrical supply system and wherein said contacts are positioned to engage each other for trickle charging said rechargeable battery when said panel assembly is in the stored position.

22. The visor as defined in claim 21 wherein said second switch means comprises a pair of spaced contacts positioned on said housing with one of said spaced contacts coupled to said rechargeable battery and the other to said lamp means, and a shorting contact positioned in said recess of said visor body to electrically couple said spaced contacts together when said panel assembly is pivoted to said first use position for actuating said lamp means.

23. The visor as defined in claim 22 wherein said spaced contacts are ball contacts.

24. A visor for a vehicle comprising:
a visor body including a compartment formed therein, said body including an opening along a lower edge of said body and communicating with said compartment;
a vanity mirror panel assembly shaped to fit within said compartment, said assembly including a mirror on one side thereof for facing toward the interior of a vehicle when said visor is in a lowered use position, said panel assembly including a battery and lamp means selectively coupled to said battery for illuminating said vanity mirror; and
means for pivotally mounting said vanity mirror panel assembly to said compartment of said visor body such that said vanity mirror panel assembly can be selectively and sequentially moved from a stored position within said compartment to a first use position extended from said compartment and attached to said visor body and subsequently to a second use position removed from said visor bosy for use at a location remote from said visor body.

25. The visor as defined in claim 24 wherein said mounting means includes means for pivoting said panel assembly from said stored position to said first use position.

26. The visor as defined in claim 25 wherein said pivoting means comprises a pivot pin and a socket for releasably holding said pivot pin such that said panel assembly can be removed from said visor.

27. The visor as defined in claim 24 wherein said vanity mirror panel assembly includes illuminating means positioned adjacent said mirror for directing illumination outwardly therefrom to facilitate use of said mirror in low ambient light conditions.

28. A visor for a vehicle comprising:
a visor body including a compartment formed therein, said body including an opening along a lower edge of said body and communicating with said compartment;
a vanity mirror panel assembly shaped to fit within said compartment, said assembly including a mirror on one side thereof for facing toward the interior of a vehicle when said visor is in a lowered use position; and
means for mounting said vanity mirror panel assembly to said compartment of said visor body such that said vanity mirror panel assembly can be selectively and sequentially moved from a stored position within said compartment to a first use position extended from said compartment and attached to said visor body and subsequently to a second use position removed from said visor body, wherein said vanity mirror panel assembly includes illuminating means positioned adjacent said mirror for directing illumination outwardly therefrom to facilitate use of said mirror in low ambient light conditions, and wherein said illuminating means is mounted within said housing and selectively provides illumination for said mirror in both said first and said second use positions.

29. The visor as defined in claim 28 wherein said illuminating means includes lamp means mounted in said housing adjacent said mirror for directing illumination outwardly from said housing, battery means positioned within said housing; and an electrical circuit selectively coupling said battery means to said lamp means for actuating said lamp means.

30. The visor as defined in claim 29 wherein said electrical circuit included a operator-actuated switch means mounted to said housing.

31. The visor as defined in claim 30 wherein said electrical circuit includes second switch means actuated by the movement of said panel assembly from said stored position to said first position for coupling said battery to said lamp means when said panel assembly is in said first position.

32. The visor as defined in claim 31 wherein said battery is a rechargeable battery.

33. The visor as defined in claim 32 wherein said electrical circuit further includes electrical contact means mounted on each of said panel assembly and within said recess of said visor body wherein said contact means on said panel assembly is coupled to said rechargeable battery and wherein said contact means in said visor recess is coupled to an electrical conductor for coupling to the vehicle's electrical supply system and wherein said contacts are positioned to engage each other for trickle charging said rechargeable battery when said panel assembly is in the stored position.

34. The visor as defined in claim 33 wherein said second switch means comprises a pair of spaced contacts positioned on said housing with one of said spaced contacts coupled to said rechargeable battery and the other to said lamp means, and a shorting contact positioned in said recess of said visor body to electrically couple said spaced contacts together when said panel assembly is pivoted to said first use position for actuating said lamp means.

35. The visor as defined in claim 34 wherein said spaced contacts are ball contacts.

36. The visor as defined in claim 35 and further including push rod means extending partially into said notch to be actuated by said pivot pin when said panel assembly is inserted into or removed from said visor body, said push rod coupled to said operator-actuated switch means to move said switch means to the off position when said push rod is actuated.

* * * * *